US009749865B2

(12) United States Patent
Moon

(10) Patent No.: US 9,749,865 B2
(45) Date of Patent: Aug. 29, 2017

(54) METHOD AND APPARATUS FOR MANAGING BEACON DEVICE

(71) Applicant: SK Planet Co., Ltd., Gyeonggi-do (KR)

(72) Inventor: SeungHoon Moon, Seoul (KR)

(73) Assignee: SK PLANET CO., LTD., Seoungnam-si, Gyeonggi-Do (KR)

( * ) Notice: Subject to any disclaimer, the term of this patent is extended or adjusted under 35 U.S.C. 154(b) by 0 days.

(21) Appl. No.: 14/954,832

(22) Filed: Nov. 30, 2015

(65) Prior Publication Data

US 2016/0309330 A1 Oct. 20, 2016

(30) Foreign Application Priority Data

Apr. 16, 2015 (KR) .......................... 10-2015-0053843

(51) Int. Cl.
*H04W 12/00* (2009.01)
*G01S 1/00* (2006.01)
(Continued)

(52) U.S. Cl.
CPC ........... *H04W 12/08* (2013.01); *H04L 63/062* (2013.01); *H04W 4/008* (2013.01); *H04W 12/04* (2013.01);
(Continued)

(58) Field of Classification Search
CPC ..... H04W 12/08; H04W 12/00; H04W 48/14; H04W 12/04; H04W 4/008; H04W 48/08;
(Continued)

(56) References Cited

U.S. PATENT DOCUMENTS 9,220,012 B1 * 12/2015 Inamdar ................ H04W 12/08
9,232,393 B2 * 1/2016 Van Phan ............. H04L 63/068
(Continued)

FOREIGN PATENT DOCUMENTS

KR 10-0678699 B1 1/2007

OTHER PUBLICATIONS

Extended Search Report in European Patent Application No. 15197140.5, dated Sep. 23, 2016.
(Continued)

*Primary Examiner* — Meless Zewdu
(74) *Attorney, Agent, or Firm* — Fenwick & West LLP

(57) ABSTRACT

Provided are a method and apparatus for managing a beacon device. More particularly, a beacon management server is connected with the beacon device through a communication network and configured to periodically updates and manages a valid period of the beacon device. The beacon device initializes itself by autonomously deleting beacon information stored therein when the beacon device has been disconnected from the beacon management server for a certain time or more. Thus, the beacon device may be managed through the beacon management server. An operation of the beacon device may be controlled even when the beacon device is lost, thereby preventing illegal use of the beacon device by controlling a beacon signal that is transmitted even after the beacon device is lost. In addition, the beacon management server may verify the validity of the beacon device to give security to the beacon device and periodically update the valid period, thereby allowing efficient use of the beacon device.

9 Claims, 7 Drawing Sheets

(51) Int. Cl.
*H04W 12/08* (2009.01)
*H04W 48/14* (2009.01)
*H04W 12/04* (2009.01)
*H04W 4/00* (2009.01)
*H04W 76/06* (2009.01)
*H04L 29/06* (2006.01)
*H04W 12/06* (2009.01)
*H04W 24/00* (2009.01)
*H04W 48/08* (2009.01)

(52) U.S. Cl.
CPC ........... *H04W 12/06* (2013.01); *H04W 48/14* (2013.01); *H04W 76/068* (2013.01); *H04L 63/0846* (2013.01); *H04W 24/00* (2013.01); *H04W 48/08* (2013.01)

(58) Field of Classification Search
CPC ..... H04W 12/06; H04W 12/12; H04W 24/00; H04W 24/02; H04W 76/068; H04W 76/06; H04W 4/00; H04L 63/062; H04L 41/08; H04L 63/0846; G06F 21/00; G06F 21/30
See application file for complete search history.

(56) References Cited

U.S. PATENT DOCUMENTS

| | | |
|---|---|---|
| 2002/0176388 A1 | 11/2002 | Rankin et al. |
| 2006/0008082 A1* | 1/2006 | Gluck ................. H04L 63/0428 380/28 |
| 2010/0293570 A1* | 11/2010 | Teraoka .............. H04L 63/0428 725/31 |
| 2015/0005011 A1* | 1/2015 | Nehrenz ................. H04W 4/02 455/456.3 |
| 2015/0012747 A1* | 1/2015 | Choi ................... H04L 63/0435 713/168 |
| 2016/0226845 A1* | 8/2016 | Kim ........................ H04L 9/083 |

OTHER PUBLICATIONS

Wayne Jansen et al., "Proximity Beasons and Mobile Device Authentication: An Overview and Implementation," National Institute of Standards and Technology, Jun. 30, 2005, XP008116239.

* cited by examiner

METHOD AND APPARATUS FOR MANAGING BEACON DEVICE

CROSS-REFERENCE TO RELATED APPLICATION

This application claims priority to and the benefit of Korean Patent Application No. 10-2015-0053843 filed in the Korean Intellectual Property Office on Apr. 16, 2015, the entire contents of which are incorporated herein by reference.

TECHNICAL FIELD

The present invention relates to a method and apparatus for managing a beacon device, and more particularly, to a method and apparatus for managing a beacon device in which validity of the beacon device may be verified through a security key issued by a beacon management server connected to the beacon device through a communication network, and an operating condition and a valid period of a beacon signal transmitted from the verified beacon device may be periodically set or updated.

BACKGROUND

This section is intended to merely provide background for embodiments of the present invention and is not considered prior art in the claims.

With the development of mobile communication networks and the advance in terminal specifications, mobile communication terminals have become the necessity for modern people and have evolved into total entertainment equipment beyond typical simple communication devices or information providing devices.

Such mobile communication terminals have a function for performing short-range wireless communication, such as near field communication (NFC) or Bluetooth, in addition to a communication function through mobile communication networks.

NFC has a short communication distance and requires a separate wireless communication chip. However, Bluetooth has a relatively long communication distance and most terminals have a Bluetooth communication function equipped therein. Thus, various communication services are being developed using Bluetooth.

Further, service solutions for providing a variety of information to mobile communication terminals possessed by users are being developed using a beacon that utilizes Bluetooth communication.

In this case, a mobile communication terminal receives a corresponding beacon identifier from a beacon and uses the beacon identifier to acquire a variety of information.

Recently, beacon devices are installed in stores such as a coffee shop, a department store, or the like. Accordingly, when a user with a terminal, such as a smartphone or tablet, equipped with a function of sensing identities (IDs) of beacon signals transmitted by beacon devices enters a corresponding place, the terminal senses an ID of a beacon signal and receives various kinds of services through a communication network using the sensed ID.

However, if a beacon device is installed in a store, the beacon device may be stolen and reused for another purpose. Furthermore, although the beacon device is not stolen, a beacon signal transmitted by the beacon device may not be controlled and thus service users in the vicinity of the beacon device may have difficulties in that they may receive service information irrelevant to their locations.

PRIOR ART DOCUMENT

Patent Document

Korean Patent No. 10-0678699 registered on Feb. 5, 2007, entitled "Method and System for Providing Remote Control Function of Beacon Module"

SUMMARY

The present invention has been proposed to solve a problem in which, when a conventional beacon device is lost, an operation of the beacon device cannot be controlled and thus service users receive unnecessary service information regardless of their locations and to prevent reuse of the lost beacon device. In particular, the present invention is directed to managing a valid period of a beacon device through a beacon management server in periodic communication with the beacon device.

The present invention is also directed to a method and apparatus for managing a beacon device in which security can be increased by verifying the validity of the beacon device through a security key issued to the beacon device and preventing reuse of the beacon device when the validity of the beacon device is not verified, or when the beacon device has been disconnected from the beacon management server for a certain time.

One aspect of the present invention provides a beacon management server including a communication module connected with a beacon device through a communication network and configured to transmit or receive data for managing authority of the beacon device, a security authentication module configured to secure setting authority of the beacon device in an administrator mode in which the beacon device is accessed with a predetermined administrator password, issue a security key, and periodically check the issued security key to verify validity of the beacon device, a beacon management module configured to set an operating condition including one or more of an ID, a transmission power, a signal interval, and a valid period of a beacon signal of the beacon device to which the security key is issued and update the valid period according to the validity verification of the security authentication module, and a storage module configured to store one or more of the operating condition and the security key for each piece of beacon identification information.

The security authentication module may control a beacon operation in communication with the beacon device or set a user password for allowing direct access to the beacon device and control of the beacon operation.

When the validity of the beacon device is not verified, a beacon signal transmission function of the beacon device may be deactivated or the beacon device may be initialized and then restricted from resetting or changing a user password.

Another aspect of the present invention provides a beacon device including a network interface module connected with a beacon management server through a communication network and configured to transmit or receive data for controlling the beacon device, a signal transmission module configured to a transmit Bluetooth low energy (BLE)-based beacon signal, a control module configured to receive a predetermined administrator password from the beacon management server, provide setting authority, receive a security key and an operating condition including a valid period from the beacon management server, perform control such that the signal transmission module transmits the beacon signal according to the operating condition, transmit the security key in response to a security key request for verifying validity of the beacon device from the beacon management server, and reset an updated valid period when the validity is verified, and a storage module configured to store a beacon signal operating condition including the valid period set from the beacon management server.

When the beacon device has been disconnected from the beacon management server for a certain time or more or when the valid period has expired, the beacon device may be initialized and information stored in the beacon device may be deleted.

When the beacon device has been disconnected from the beacon management server for a certain time or more or when the valid period has expired, a beacon signal transmission function of the beacon device may be deactivated.

When the beacon device has been disconnected from the beacon management server for a certain time or more or when the valid period has expired, the beacon device may be restricted from resetting or changing a user password.

When the beacon device has been disconnected from the beacon management server for a certain time or more or when the valid period has expired, the beacon device may be restricted from changing environmental settings including the operating condition of the beacon device.

Still another aspect of the present invention provides a beacon management service method including using, by a beacon management server, a predetermined administrator password to access a beacon device in an administrator mode, issuing, by the beacon management server that performs access in the administrator mode, a security key of the beacon device, setting, by the beacon management server, an operating condition including an valid period of the beacon device, checking, by the beacon management server, the issued security key in periodic communication with the beacon device, and when the security key is valid, updating the valid period of the beacon device.

The issuing of the security key may further include controlling a beacon operation in communication with the beacon device or setting a user password for allowing direct access to the beacon device and control of the beacon operation.

The beacon management service method may further include, when the security key is not valid, initializing the beacon device and then restricting the beacon device from resetting or changing a user password.

According to an embodiment of the present invention, the beacon device may be managed through the beacon management server and thus an operation of the beacon device may be controlled even when the beacon device is lost, thereby preventing illegal use of the beacon device by controlling the beacon signal transmitted even after the beacon device is lost.

In addition, the beacon management server may verify the validity of the beacon device to give security to the beacon device and update the valid period, thereby allowing efficient use of the beacon device.

Furthermore, when the beacon device is lost and then the connection is disconnected, the beacon device may initialize itself and delete information stored therein, thereby preventing reuse of the beacon device.

Various effects other than those described above may be disclosed directly or implicitly in the detailed description according to the following exemplary embodiment of the present invention.

DETAILED DESCRIPTION

Figure 1:
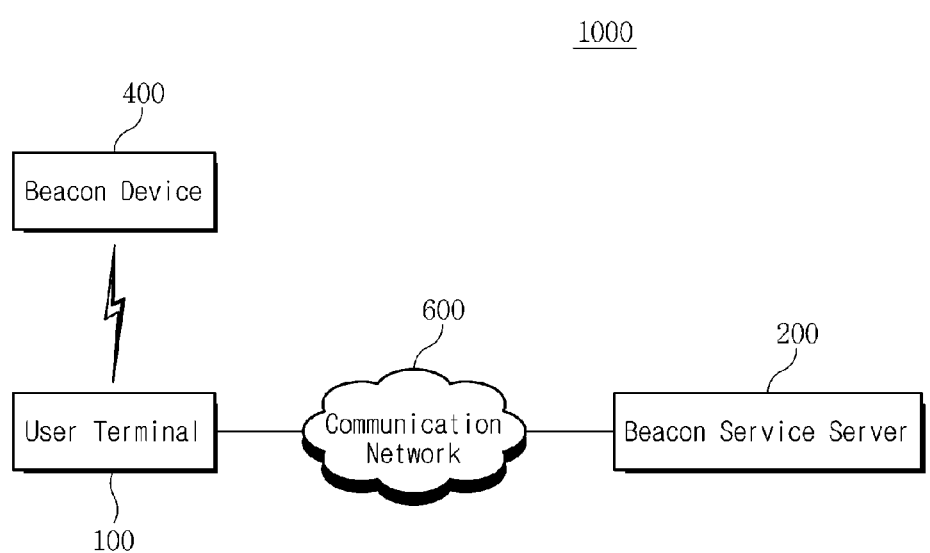
FIG. 1 is a view showing a schematic configuration of a conventional beacon service system.

Hereinafter, exemplary embodiments of the present invention will be described in detail with reference to the accompanying drawings. The features and advantages of aspects of the present invention will become more apparent from the detailed description set forth below.

However, detailed descriptions related to well-known functions or configurations will be ruled out in order not to unnecessarily obscure the subject matter of the present invention.

In addition, it should be noted that like reference numerals denote like elements throughout the specification and drawings.

The terms or words used in the following description and drawings should not be construed as being limited to typical or dictionary meanings, but should be construed as the meaning and concept corresponding to the technical idea of the present invention on the basis of the principle that an inventor can appropriately define the concept of the term for describing his or her invention in the best manner.

Accordingly, the configurations illustrated in embodiments and drawings described in the specification do not represent the technical idea of the present invention but are just exemplary embodiments. Thus, it should be understood that various equivalents and modifications may exist which can be replaced at the time of filing an application.

While the terms including an ordinal number, such as "first," "second," etc. may be used herein to describe various elements, such elements are not limited to those terms. The terms are only to distinguish one component from another. For example, a first component may be named a second component, and vice versa, without departing from the scope of the present invention.

It is to be understood that when one element is referred to as being "connected to" or "coupled to" another element, it may be connected or coupled logically or physically.

In other words, it is to be understood that one element may be directly connected or coupled to another element or indirectly connected or coupled to another element with a third element intervening therebetween.

The terms used in the present specification are set forth to explain the embodiments of the present invention, and the scope of the present invention is not limited thereto.

The singular forms 'a,' 'an,' and 'the' include plural reference unless the context clearly dictates otherwise.

In the present specification, it is to be understood that the terms such as "including," "having," and "comprising" are intended to indicate the existence of the features, numbers, steps, operations, components, parts, or combinations thereof disclosed in the specification, and are not intended to preclude the possibility that one or more other features, numbers, steps, operations, components, parts, or combinations thereof may exist or may be added.

Further, embodiments within the scope of the present invention also include computer-readable media for carrying or storing computer-executable instructions and/or data structures.

Such computer-readable media can be any available media that can be accessed by a general purpose or special purpose computer system.

Thus, by way of example, and not limitation, embodiments of the invention can include physical computer-readable storage media including RAM, ROM, EPROM, CD-ROM or other optical disk storage, magnetic disk storage or other magnetic storage devices, or any other medium which can be used to store or deliver desired program code means in the form of computer-executable instructions, computer-readable instructions, or data structures and which can be accessed by a general purpose or special purpose computer.

The computer-readable instructions include, for example, instructions and data which cause a general purpose computer or special purpose computer to perform a certain function or group of functions.

The computer-executable instructions may be, for example, binaries, intermediate format instructions such as assembly language, or even source code.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like.

The invention may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

In addition, a beacon service according to an embodiment of the present invention will be described based on Bluetooth low energy (BLE) type data communication technology. While NFC technology may be available only within several tens of centimeters, Bluetooth technology may operate in the range of several tens of meters and thus have been applied to a wide variety of applications. In particular, the Bluetooth technology can transfer data even when a user just passes through a place where a beacon device is installed without needing to approach and then touch a reader like in NFC technology, and also can read even location movement inside a building and transfer customized data.

However, the beacon service according to an embodiment of the present invention is not necessarily limited to Bluetooth low energy (BLE) or Bluetooth. Accordingly, various personal area network (PAN) type short-distance communication technologies such as Zigbee, Ultra WideBand (UWB), ANT, and Wi-Fi may be available.

A method and apparatus for controlling a power level of a beacon signal in a beacon service system according to an embodiment of the present invention will be described in detail with reference to the drawings.

First, a basic structure of a beacon service system will be schematically described.

FIG. 1 is a view showing a schematic configuration of a general beacon service system.

Referring to FIG. 1, a beacon service system 1000 may include a user terminal 100, a beacon service server 200, a beacon device 400, and a communication network 600.

The beacon device 400 may transmit a beacon signal by periods. When the user terminal 100 approaches within a certain distance from the beacon device 400 and then senses the beacon signal, the user terminal 100 may transmit an identity (ID) of the sensed beacon signal to the beacon service server 200 through the communication network 600 and receive various service information mapped to the ID from the beacon service server 200.

For example, in the general beacon service system, the various service information provided by the beacon service server 200 may include a Hello message or Good-bye message corresponding to entrance into or exit out of a store, coupon information, discount information, promotion information, and information regarding a product approached by the user terminal 100.

In this case, the ID of the beacon signal transmitted by the beacon device 400 may be set by accessing the beacon device 400 through a predetermined password using a beacon environment setting program.

In this beacon service system, the ID included in the beacon signal transmitted by the beacon device 400 and a transmission power of the beacon signal may be changed as necessary. The beacon device 400 is required to be managed. For example, when the beacon device 400 is lost, the information should be initialized to prevent the beacon device 400 from being reused for an illegal purpose. The present invention is intended to provide a management system that may manage the beacon device 400.

Figure 2:
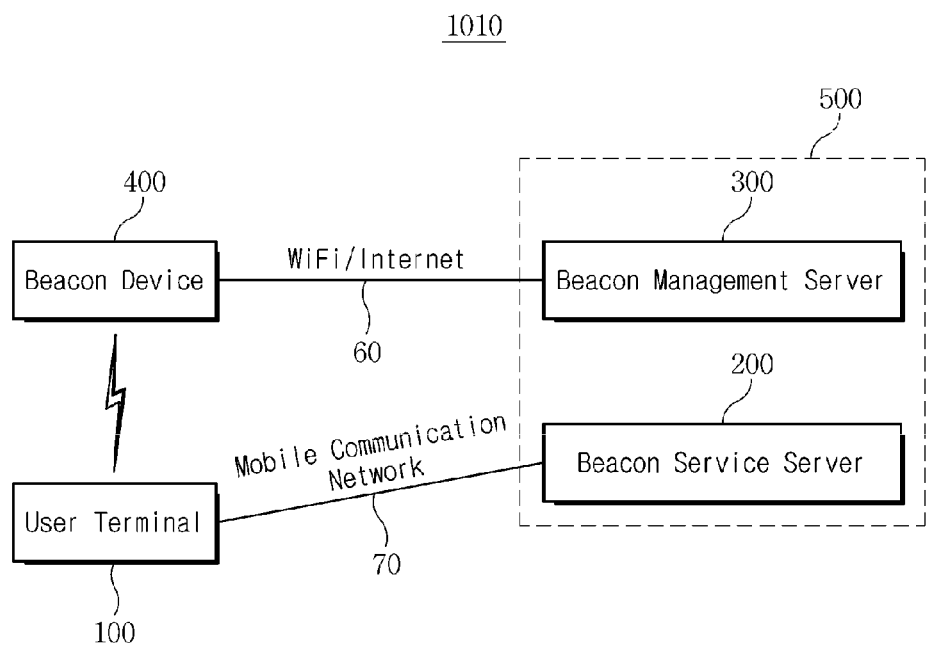
FIG. 2 is a block diagram showing a schematic configuration of a beacon device management system according to an embodiment of the present invention.

FIG. 2 is a view showing a schematic configuration of a beacon device management system according to an embodiment of the present invention.

Referring to FIG. 2, a beacon device management service system 1010 according to an embodiment of the present invention may include a user terminal 100, a beacon service server 200, a beacon management server 300, a beacon device 400, a beacon system 500, a Wi-Fi or Internet network 60, and a mobile communication network 70.

Each element will be schematically described below. First, the user terminal 100 according to an embodiment of the present invention denotes a user device that may transmit and receive various types of data via a communication network according to manipulation of a user.

The user terminal 100 according to an embodiment of the present invention may be a terminal capable of Bluetooth communication (e.g., Bluetooth 4.0, that is, Bluetooth low energy (hereinafter, referred to as BLE)) and may receive a beacon signal transmitted from the beacon device 400 through BLE communication and thus perform predetermined processing.

The user terminal 100 may perform voice or data communication through a communication network. For example, when a beacon signal transmitted by the beacon device 400 is received, the user terminal 100 may communicate with the beacon service server 200 through the mobile communication network 70 to receive various service information mapped to an ID of the received beacon signal. The user terminal 100 according to an embodiment of the present invention may include a browser for transmitting and receiving information, a memory for storing programs and protocols, a microprocessor for executing various types of programs to perform calculation and control, etc.

The user terminal 100 according to an embodiment of the present invention may be implemented in various forms. For example, the user terminal 100 used herein may be a stationary terminal such as a smart TV, a desktop computer, and the like as well as a mobile terminal such as a smart phone, a tablet PC, an MP3 player, etc.

In accordance with the convergence trend of digital devices, there are various modifications of a mobile device, which are too many to enumerate. A unit equivalent to the above-described units may be used as the user terminal 100 according to an embodiment of the present invention. As long as any device transmits and receives information to and from the beacon service server 200 through the mobile communication network 70 and transmits and receives information to and from the beacon device 400 in a short-range wireless communication scheme, the device may be used as the user terminal 100 according to an embodiment of the present invention.

The beacon service server 200 according to an embodiment of the present invention may be connected with the user terminal 100 through the communication network 600, particularly in the present invention, through the mobile communication network 70.

The beacon service server 200 may communicate with the user terminal 100 to provide service information mapped to an ID of a beacon signal received by the user terminal 100 to the user terminal 100.

Furthermore, the beacon management server 300 according to an embodiment of the present invention may be a server for managing the beacon device 400 and may set environmental conditions and operating conditions of the beacon device 400.

In this case, the beacon management server 300 may be located in a remote position and connected with the beacon device 400 through a communication network. For example, the beacon management server 300 and the beacon device 400 according to an embodiment of the present invention may be accessed using the Wi-Fi network and the Internet network 60.

The connection between the beacon device 400 and the beacon management server 300 and between the user terminal 100 and the beacon service server 200 according to an embodiment of the present invention has been described on the basis of the WiFi/Internet network 60 and the mobile communication network 70, but is not limited thereto.

In addition, the beacon system 500 according to an embodiment of the present invention may be implemented as one server device.

That is, the beacon service system according to an embodiment of the present invention has been described as being divided into the beacon management server 300 and the beacon service server 200. However, the beacon service server 200 may be functionally installed in the beacon management server 300 and operated.

Generally, the beacon device 400 according to an embodiment of the present invention may be installed in a store and configured to transmit a beacon signal in a certain range from about 5 cm to about 49 m. The user terminal 100 may continuously scan the presence of the beacon signal transmitted in the certain range and may sense the transmitted beacon signal.

In addition, the beacon device 400 according to an embodiment of the present invention may operate on the basis of operating conditions that are set in the beacon management server 300 and may transmit the beacon signal using short-distance wireless communication.

Preferably, the beacon device 400 may transmit the beacon signal using Bluetooth low energy (BLE), but is not limited thereto. The beacon device 400 may transmit the beacon signal using Radio Frequency Identification (RFID), Zigbee, near field communication (NFC), etc.

The beacon signal transmitted by the beacon device 400 according to an embodiment of the present invention includes identification information for identifying the beacon device 400. The identification information included in the beacon signal may include at least one of a Universally Unique Identifier (UUID) of the beacon device 400, a major indicating a group of beacon devices, and a minor indicating a certain beacon device in the group of beacon devices.

The main configurations and operating methods of the beacon management server 300 and the beacon device 400 will be described below in more detail. A processor installed in each device according to an embodiment of the present invention may process program instructions for executing the method according to an embodiment of the present invention.

In one implementation, the processor may be a single-threaded processor. In alternative implementations, the processor may be a multithreaded processor.

Furthermore, the processor may also process a command stored in a memory or a storage device.

The beacon device 400 and the user terminal 100 according to an embodiment of the present invention have been described as transmitting or receiving information in a BLE communication scheme, but are not limited thereto. If any communication scheme allows a certain signal including its own identification information to be transmitted, the communication scheme may be applied to an embodiment of the present invention.

In addition, the user terminal 100 and the beacon device 400 according to an embodiment of the present invention may interoperate with the beacon system 500 including the beacon management server 300 and the beacon service server 200 through the communication network 600. According to an embodiment of the present invention, the beacon device 400 may be connected with the beacon management server 300 through the WiFi/Internet network 60, and the user terminal 100 according to an embodiment of the present invention may be connected with the beacon service server 200 through the mobile communication network 70, but are not necessarily limited thereto.

The communication network 600 denotes a network that may transmit and receive data through an Internet protocol using various wired/wireless communication technologies, such as an Internet network, an intranet network, a mobile communication network, a satellite communication network.

In addition, the communication network is combined with the beacon system 500 and configured to store computing resources such as hardware or software.

The communication network 600 includes networks utilizing Code Division Multiple Access (CDMA), Wideband Code Division Multiple Access (WCDMA), Global System for Mobile Communications (GSM), Long Term Evolution (LTE), Evolved Packet Core (EPC), and others, next generation networks, and computing networks, in addition to a closed network (for example, a local area network (LAN), a wide area network (WAN), etc.) and an open network (for example, the Internet).

Moreover, the communication network according to an embodiment of the present invention may include, for example, a plurality of access networks (not shown) and core networks (not shown) and may further include an external network, for example, the Internet network 60. Here, each of the access networks (not shown) is an access network that performs wired/wireless communication with the user terminal 100 and may be implemented as a plurality of base stations such as a base station (BS), a base transceiver station (BTS), a NodeB, and an eNodeB and a base station controller such as a radio network controller (RNC).

In addition, as described above, a digital signal processing unit and a wireless signal processing unit that are integrally implemented in the base station are separated as a digital unit (hereinafter referred to as a DU) and a radio unit (hereinafter referred to as a RU), respectively. A plurality of RUs (not shown) may be installed in a plurality of regions and may be connected with a concentrated DU (not shown).

In addition, a core network (not shown) constituting a mobile network along with an access network (not shown) serves to connect the access network (not shown) with an external network, for example, the Internet network 60.

As described above, the core network (not shown) is a network system that performs a main function for mobile communication service of mobility control and switching between access networks (not shown) and is configured to perform circuit switching or packet switching and manage and control a packet flow in the mobile network.

In addition, the core network (not shown) may serve to manage mobility between frequencies and interoperate between traffic in the access network (not shown) and the core network (not shown) and another network, for example, the Internet network 60.

The core network (not shown) may further include a serving gateway (SGW), a PDN gateway (PGW), a mobile switching center (MSC), a home location register (HLR), a mobile mobility entity (MME), and a home subscriber server (HSS).

In addition, the Internet network 60 may denote a typical open communication network through which information is exchanged according to a TCP/IP protocol, that is, a public network and may be connected with the beacon management server 300 and configured to provide an environmental condition that is set from the beacon management server 300 to the beacon device 400 via the core network (not shown) and the access network (not shown).

A management process of the above-described beacon device according to an embodiment of the present invention will be described in more detail with reference to FIGS. 3 to 9.

A main configuration and an operation method of a beacon management server according to an embodiment of the present invention will be described below.

Figure 3:
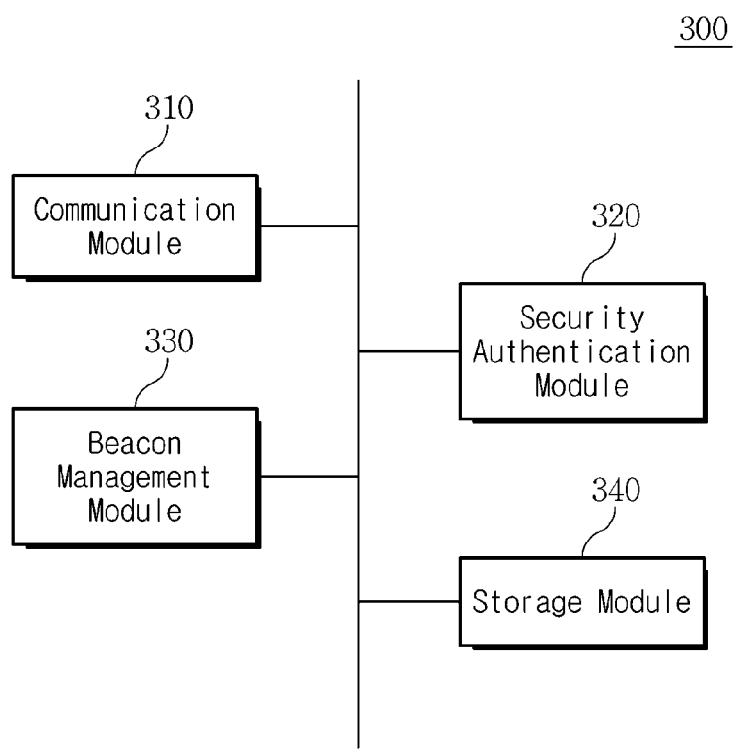
FIG. 3 is a block diagram showing a main configuration of a beacon management server according to an embodiment of the present invention.

FIG. 3 is a view showing a main configuration of a beacon management server according to an embodiment of the present invention.

Referring to FIG. 3, the beacon management server 300 according to an embodiment of the present invention may include a communication module 310, a security authentication module 320, a beacon management module 330, and a storage module 340.

The term "module" used herein may be an element that performs a predetermined function and may be implemented in hardware, software, or a combination thereof. For example, the module may denote a program module.

The program module includes elements that are executed by a processor to perform predetermined functions, such as software elements, object-oriented software elements, class elements, and task elements, and also processes, functions, attributes, procedures, sub-routines, segments of program codes, drivers, data, database, data structures, tables, arrays, and variables. In addition, the functions provided in the elements and the modules may be combined as a smaller number of elements and modules or further divided into additional elements and modules.

An operation of the beacon management server 300 according to an embodiment of the present invention will be described below in more detail. First, the communication module 310 may be connected with the beacon device 400 through the communication network 600 and configured to transmit and receive data to manage authority of the beacon device 400.

The security authentication module 320 in the beacon management server 300 according to an embodiment of the present invention is an element for verifying validity of the beacon device 400 and may issue a security key for establishing a communication session with the beacon device 400 through the communication module or for verifying validity of the beacon device 400. In this case, the security authentication module 320 may identify the beacon device 400 using any one of media access control (MAC) address information and a serial number.

Here, the MAC address information denotes a physical address of the Ethernet, which is a network model used in a local area network (LAN), which is an information communication network in a certain zone. The MAC address is recorded in a read only memory (ROM) of an Ethernet card and has a size of 48 bits. The Institute of Electrical and Electronics Engineers (IEEE) commonly allocates the former 24 bits to public communication network providers, and then the public communication network providers suballocate the latter 24 bits.

In addition, the serial number is a unique number that is uniformly assigned to a beacon device product in a production stage of the beacon device and may be used to identify the product.

When certain identification information is input, the security authentication module 320 of the beacon management server 300 according to an embodiment of the present invention establishes a communication session with the beacon device 400, transmits a predetermined administrator password, acquires setting authority from the beacon device 400, and performs access in an administrator mode.

In this case, the security authentication module 320 may issue a security key for the beacon device 400. The security key may be transmitted to the beacon device 400.

Here, the security key is used to encrypt data or verify validity of the data to safely protect the data from an invader that attempts unauthorized access in a data transmission process between a transmitter and a receiver of a computer network.

Moreover, the security key according to an embodiment of the present invention may be used to authenticate the beacon device in addition to encrypting the data.

The security key includes a symmetric key and an asymmetric key. The symmetry key corresponds to a case in which a transmitter and a receiver use the same key in a single key manner. In this case, it is important that a third party other than the transmitter and the receiver is not allowed to know the key, and thus the transmitter and the receiver may periodically change the key in order to manage the security key. On the other hand, the asymmetric key corresponds to a case in which a transmitter and a receiver use different keys.

In addition, the security key is also referred to as an encryption key. The security key is a symbol string that controls cryptographic conversion, for example, encryption, decryption, cryptographic inspection, function calculation, signature calculation, and signature verification, and a value that is used to encrypt and decrypt a message.

Moreover, the security key according to an embodiment of the present invention may be used to encrypt data associated with operating conditions that are set in the beacon management server 300.

The security authentication module 320 according to an embodiment of the present invention may issue a security key to the beacon device 400 and may communicatively access the beacon device 400 by periods to check the issued security key and verify validity of the beacon device 400.

Moreover, the security authentication module 320 may control a beacon operation in communication with the beacon device 400 or may set a user password for allowing direct access to the beacon device 400 and control of the beacon operation and provide the user password to the beacon device 400.

The beacon management module 330 according to an embodiment of the present invention may set an operating condition including one or more of an ID, a transmission power, a signal interval, and an valid period of the beacon signal transmitted to the beacon device 400 to which the security key is issued.

The operating condition of the beacon device 400 that is set in the beacon management module 330 is transmitted to the beacon device 400 through the communication module 310. When the validity of the beacon device 400 is verified as a result of the validity verification in the security authentication module 320, the beacon management module 330 may update the valid period of the beacon device 400.

On the other hand, when the validity of the beacon device 400 is not verified as a result of the validity verification, the beacon management module 330 may initialize the currently accessed beacon device 400 and may restrict the beacon device 400 from performing a task of resetting or changing the user password.

For each piece of the beacon identification information, the beacon management server 300 may store and manage one or more of the operating condition and the security key in the storage module 340.

Moreover, the beacon management server 300 according to an embodiment of the present invention has been described as only including the communication module 310, the security authentication module 320, the beacon management module 330, and the storage module 340, but is not limited thereto. The beacon management server 300 may further include various modules that may perform a function for managing the beacon device.

Figure 5:
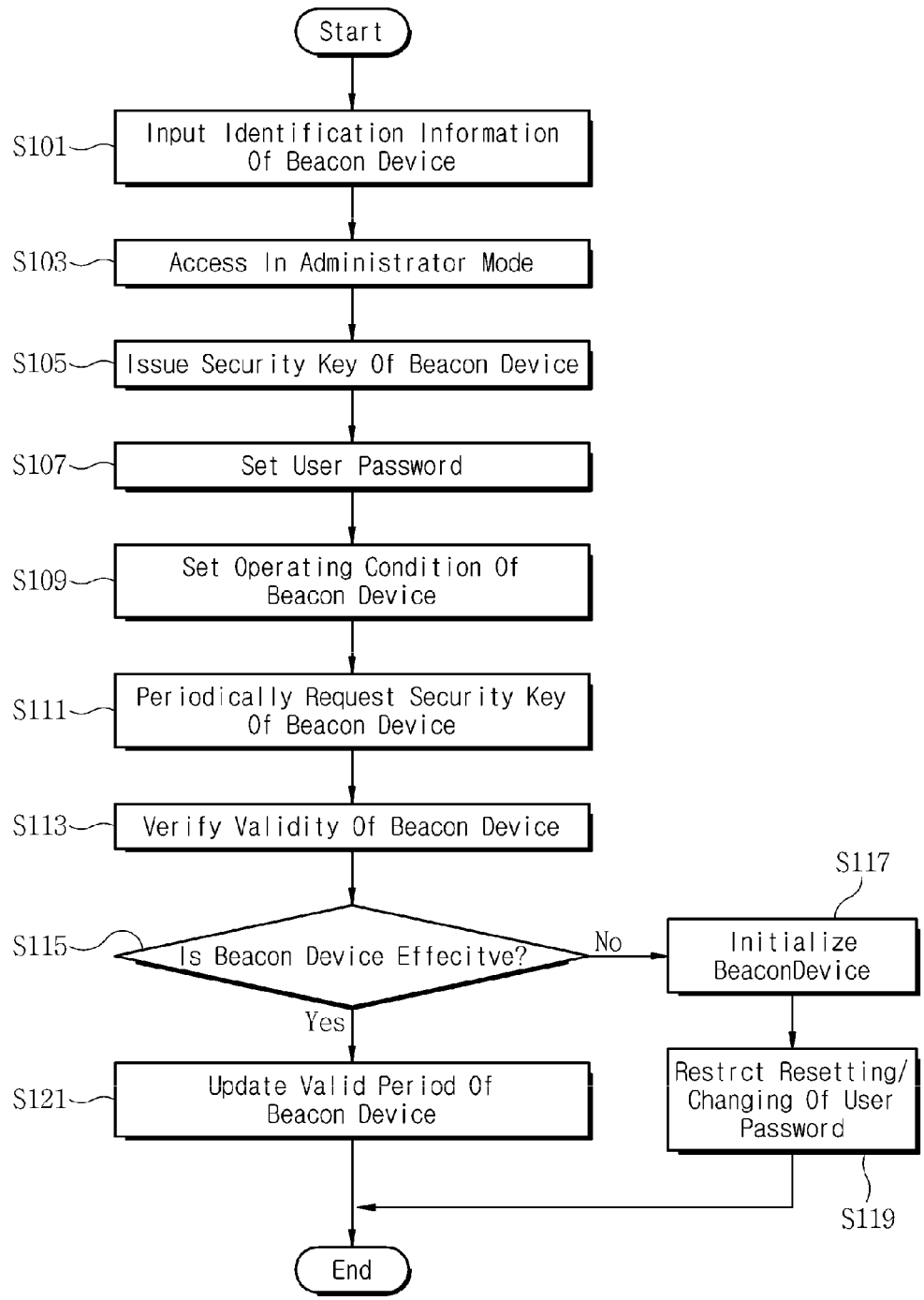
FIG. 5 is a flowchart showing a method of providing a service in a beacon management server according to an embodiment of the present invention.

A detailed operation of the beacon management server 300 according to an embodiment of the present invention will be more apparently understood with reference to a flowchart of FIG. 5.

Next, the beacon device 400 according to an embodiment of the present invention will be described below.

Figure 4:
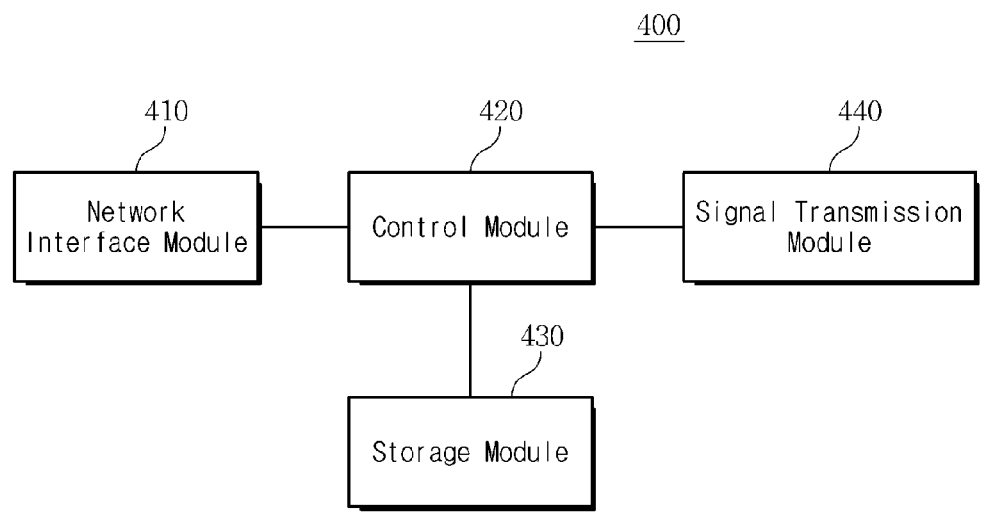
FIG. 4 is a block diagram showing a main configuration of a beacon device according to an embodiment of the present invention.

FIG. 4 is a view showing a main configuration of a beacon device according to an embodiment of the present invention.

Referring to FIG. 4, the beacon device 400 according to an embodiment of the present invention may include a network interface module 410, a control module 420, a storage module 430, and a signal transmission module 440.

The beacon device 400 according to an embodiment of the present invention accesses the communication network 600 through a network interface module and connects to the beacon management server 300 to transmit and receive data for controlling the beacon device 400.

The beacon device 400 according to an embodiment of the present invention may include the signal transmission module 440 for transmitting a BLE-based beacon signal and transmit the beacon signal according to the control of the control module 420.

When the beacon management server 300 inputs a predetermined administrator password, the control module 420 of the beacon device 400 according to an embodiment of the present invention may perform administrator authentication to provide setting authority to the beacon management server 300 and receive the security key and the operating condition of the signal transmission module 440 from the beacon management server 300 through the network interface module 410.

Here, the operating condition may include one or more of the ID, transmission power, signal interval, and valid period of the beacon signal. In this case, the storage module 430 of the beacon device 400 may store and manage the operating condition and security key of the beacon signal including the valid period that is set from the beacon management server 300.

Subsequently, the control module 420 of the beacon device 400 may communicatively access the beacon management server 300 through the network interface module 410 by periods, receive a request for the security key in order to verify the validity of the beacon device 400 from the beacon management server 300, and provide the security key stored in the beacon device 400 to the beacon management server 300 in response to the request.

When the validity of the beacon device 400 is verified as a result of the validity verification of the security key from the beacon management server 300, the control module 420 of the beacon device 400 according to an embodiment of the present invention may receive a newly updated valid period of the beacon device 400 from the beacon management server 300 and reset the updated valid period and may control an operation of the signal transmission module 440 to transmit the beacon signal according to an operating condition including the reset valid period.

On the other hand, when the validity of the beacon device 400 is not verified as a result of the validity verification of the security key from the beacon management server 300, the beacon device 400 is initialized by initialization setting in the beacon management server 300, and thus all information stored in the beacon device 400 is deleted.

When it is periodically checked whether the beacon device 400 is connected with the beacon management server 300 to determine that the connection has been blocked for a certain time or more, the beacon device 400 may initialize itself and delete all information stored therein.

Moreover, the beacon device 400 may be restricted from autonomously changing or resetting the user password received from the beacon management server 300, without the beacon management server 300.

In addition, when it is periodically checked whether the beacon device 400 is connected with the beacon management server 300 to determine that the connection has been blocked for a certain time or more, the beacon device 400 according to an embodiment of the present invention may be restricted from attempting to perform access in order to change an operating condition including one or more of the ID, transmission power, signal interval, and valid period of the beacon signal transmitted by the signal transmission module 440 of the beacon device 400 and other environmental settings of the beacon device 400.

The signal transmission module 440 according to an embodiment of the present invention may be a BLE communication module that is based on Bluetooth communication (e.g., Bluetooth 4.0, i.e., Bluetooth Low Energy (hereinafter referred to as BLE)).

The beacon device 400 according to an embodiment of the present invention controls an operation of the beacon device 400 by determining whether the valid period has expired as well as whether the beacon device 400 is connected with the beacon management server 300, among the operating conditions stored in the beacon device 400. A method of controlling the beacon device 400 will be described below.

The beacon device 400 according to an embodiment of the present invention may authenticate administrator access of the beacon management server 300 to provide setting authority to the beacon management server 300 that has performed access in an administrator mode and may receive the security key from the beacon management server 300 and the operating condition of the beacon signal transmitted from the signal transmission module 440 of the beacon device 400 and store the received security key and operating condition in the storage module 430.

Subsequently, the control module 420 of the beacon device 400 may control the signal transmission module 440 to transmit a beacon signal according to the received operating condition.

In addition, the beacon device 400 transmits a prestored security key in response to a key request of a security key for verifying the validity of the beacon device from the beacon management server 300. When the beacon device 400 is determined to be valid according to a result of the validity verification of the beacon device by the beacon management server 300, the beacon device 400 updates the valid period and receives and stores settings from the beacon management server 300. In this case, the beacon device 400 according to an embodiment of the present invention may determine whether the prestored valid period has expired. When the valid period has expired, the beacon device 400 may initialize itself and operate in the same manner as a case in which the above-described connection between the beacon device 400 and the beacon management server 300 is blocked.

That is, when the valid period stored in the beacon device 400 has expired, the beacon device 400 is determined to be a device that does not transmit a beacon signal any more and thus initialized autonomously or by the beacon management server 300. Accordingly, all information stored in the beacon device 400 is deleted.

In addition, the beacon device 400 may be restricted from changing or resetting the user password received from the beacon management server 300. Moreover, the beacon device 400 may be restricted from attempting to perform access in order to change an operating condition including one or more of the ID, transmission power, signal interval, and valid period of the beacon signal transmitted by the signal transmission module 440 of the beacon device 400 and other environmental settings of the beacon device 400.

This limitation may be performed to prevent a lost or stolen beacon device from being illegally used, that is, improperly reused.

A detailed operation of the beacon management server described in FIG. 3 will be described below.

FIG. 5 is a flowchart showing a method of providing a service in a beacon management server according to an embodiment of the present invention.

Referring to FIG. 5, in a service providing method in the beacon management server 300 according to an embodiment of the present invention, the beacon management server 300 inputs identification information of the beacon device 400 (S101). In this case, the identification information of the beacon device may be MAC address information or a serial number.

Thus, the beacon management server 300 inputs a predetermined administrator password of the beacon device 400 corresponding to the identification information to perform access in an administrator mode and acquire setting authority (S103).

Upon access in the administrator mode, the beacon management server 300 issues a security key of the beacon device 400 (S105). Subsequently, the beacon device 400 is accessed through the beacon management server 300, or the beacon management server 300 sets a user password that may be used in the beacon device 400 itself (S107).

The beacon management server 300 may set an operating condition of a beacon signal transmitted from the beacon device 400 (S109). In this case, the operating condition of the beacon signal may include one or more of an ID, a transmission power, a signal interval, and an valid period of the beacon signal.

In addition, the beacon management server 300 may encrypt the operating condition with the security key and then transmit the encrypted operating condition to the beacon device 400.

The beacon management server 300 that has set the operating condition of the beacon device 400 periodically accesses the beacon device 400 and requests an issued security key from the beacon device 400 for security (S111) and receives the security key from the beacon device 400 and verifies validity of the beacon device 400 (S113).

In this case, the validity verification may be performed through a process of comparing the security key issued to the beacon device 400 by the beacon management server 300 with the security key received from the currently connected beacon device 400 to determine whether the security keys are the same.

In addition, the validity verification may include a hash algorithm that is an algorithm of mapping any length of data to a fixed length of data and a digital signature of electronic information attached to or logically combined with an electronic document in order to indicate a person who is a signer and that the signer has signed this electronic document.

When the validity of the beacon device 400 is verified as a result of the validity verification, the beacon management server 300 updates the valid period of the beacon device 400

(S121). On the other hand, when the validity of the beacon device 400 is not verified, the beacon management server 300 determines that the beacon device 400 is not valid and initializes the beacon device (S117) and restricts the beacon device 400 from resetting or changing a user password (S119).

A service providing method in the beacon device according to an embodiment of the present invention will be described below.

Figure 6:
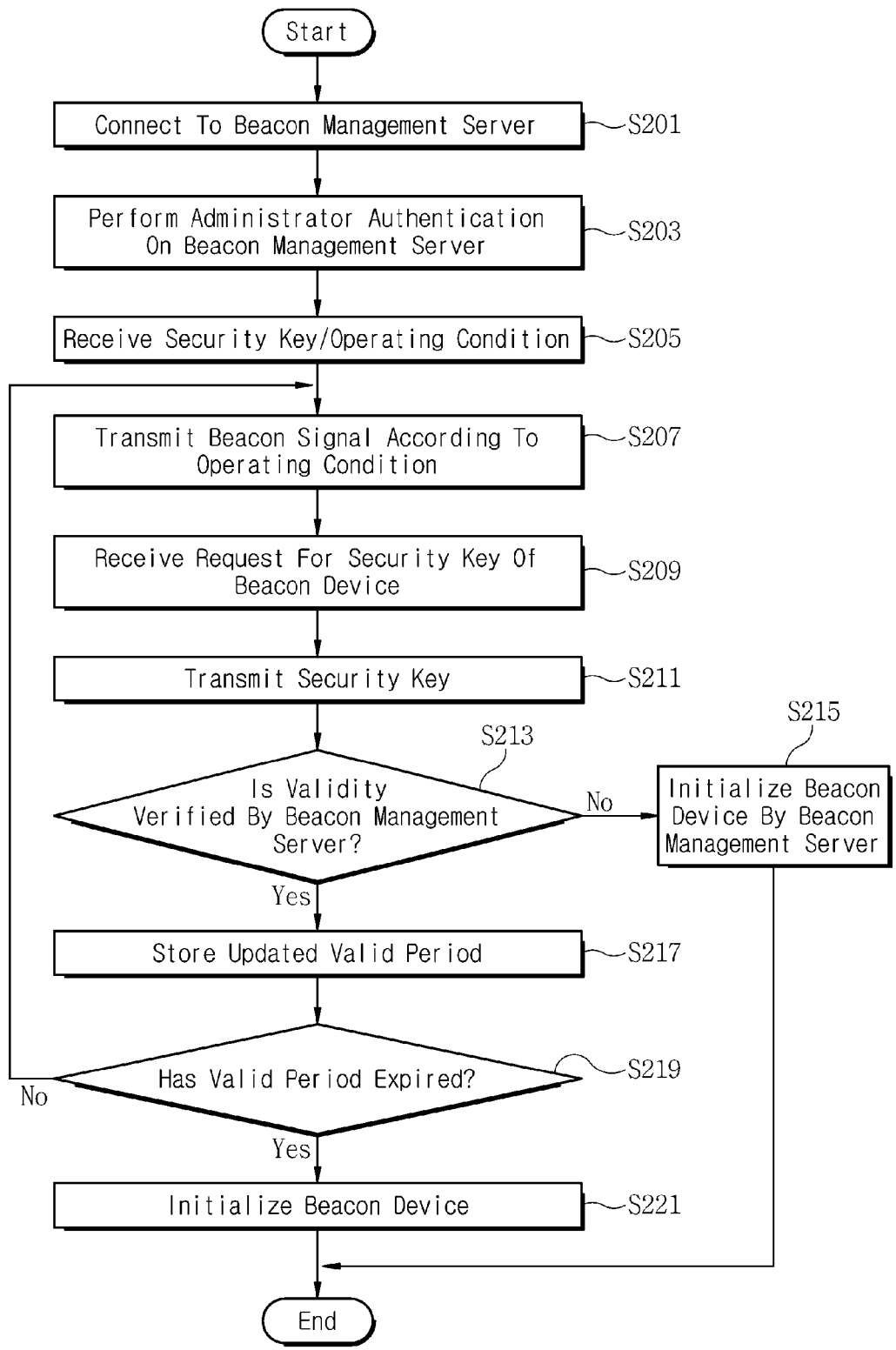
FIG. 6 is a flowchart illustrating a method of providing a service in a beacon device according to an embodiment of the present invention.

FIG. 6 is a flowchart illustrating a method of providing a service in a beacon device according to an embodiment of the present invention.

Referring to FIG. 6, in the service providing method in the beacon device 400 according to an embodiment of the present invention, when the beacon device 400 is communicatively connected with the beacon management server 300 (S201), the beacon device 400 authenticates an administrator password input from the beacon management server 300 and performs administrator authentication to allow administrator mode connection of the beacon management server 300 (S203).

Subsequently, the beacon device 400 receives a security key of the beacon device 400 and an operating condition including an valid period, which are set by the beacon management server 300 (S205) and store the security key and the operating condition in the storage module 430.

The beacon device 400 transmits a beacon signal to provide a service according to the received operating condition (S207), communicatively accesses the beacon management server 300 by periods to receive a request for a security key from the beacon management server 300 (S209), and transmits the security key stored in the storage module 430 to the beacon management server 300 (S211).

Subsequently, the beacon device 400 determines whether the beacon management server 300 that has received the security key performs validity verification (S213). When the validity is verified, the beacon device 400 receives an updated valid period from the beacon management server 300 and then updates and stores the operating condition (S217). When the validity is not verified, the beacon device 400 is initialized by the beacon management server 300 (S215), and thus the service ends.

Again, after the validity is verified, the beacon device 400 stores the updated valid period, determines whether a predetermined valid period has expired (S219), and initializes itself (S221) to end the service when the valid period has expired.

In this case, in S215 and S221, the beacon device 400 may delete all information stored in the beacon device 400 in addition to the initialization.

In addition, the beacon device 400 may be restricted from resetting or changing the environmental settings including the operating condition stored in the beacon device.

On the other hand, when the valid period of the beacon device 400 has not expired, the beacon device 400 may transmit a beacon signal according to the predetermined operating condition (S207) and perform subsequent operations according to the flowchart.

An operation based on whether the beacon device is connected with the beacon management server according to an embodiment of the present invention will be described below.

Figure 7:
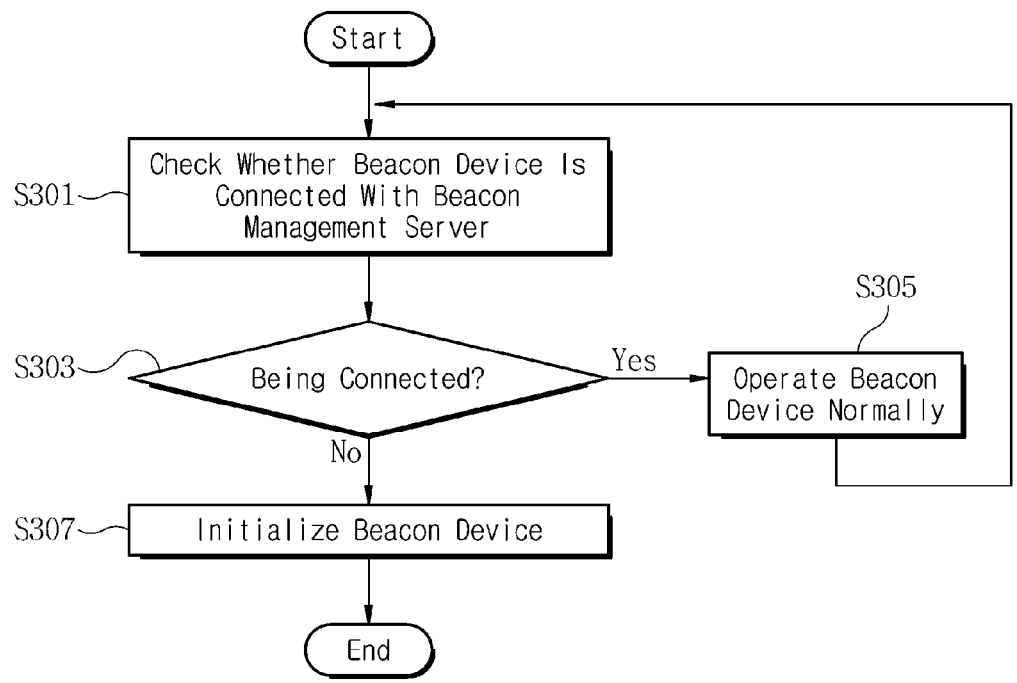
FIG. 7 is a flowchart illustrating an initialization process in a beacon device according to an embodiment of the present invention.

FIG. 7 is a flowchart illustrating an initialization process in a beacon device according to an embodiment of the present invention.

Referring to FIG. 7, the beacon device 400 according to an embodiment of the present invention may periodically check whether the beacon device 400 is connected with the beacon management server 300 (S301).

Subsequently, the beacon device 400 determines whether the beacon device 400 is connected with the beacon management server 300 (S303). When it is determined that the beacon device 400 is connected with the beacon management server 300, the beacon management server 300 performs control such that the beacon device 400 operates normally (S305).

Subsequently, the beacon device 400 may repeat the above-described process by repeatedly performing the process (S301) of checking whether the beacon device 400 is connected with the beacon management server 300.

On the other hand, when it is determined that the connection has been blocked for a certain time or more as a result obtained by periodically checking whether the beacon device 400 is connected with the beacon management server 300, the beacon device 400 cannot be initialized by the beacon management server 300 and thus may be initialized autonomously (S307).

In addition, the beacon device 400 may delete information stored in the beacon device 400 and may be restricted by the beacon management server 300 from arbitrarily resetting or changing the predetermined user password.

In addition, the beacon device 400 may be restricted from changing environmental settings including the prestored operating condition of the beacon device 400.

A procedure of the beacon management service will be described below in order to increase the understanding of a beacon management service system according to an embodiment of the present invention.

Figure 8:
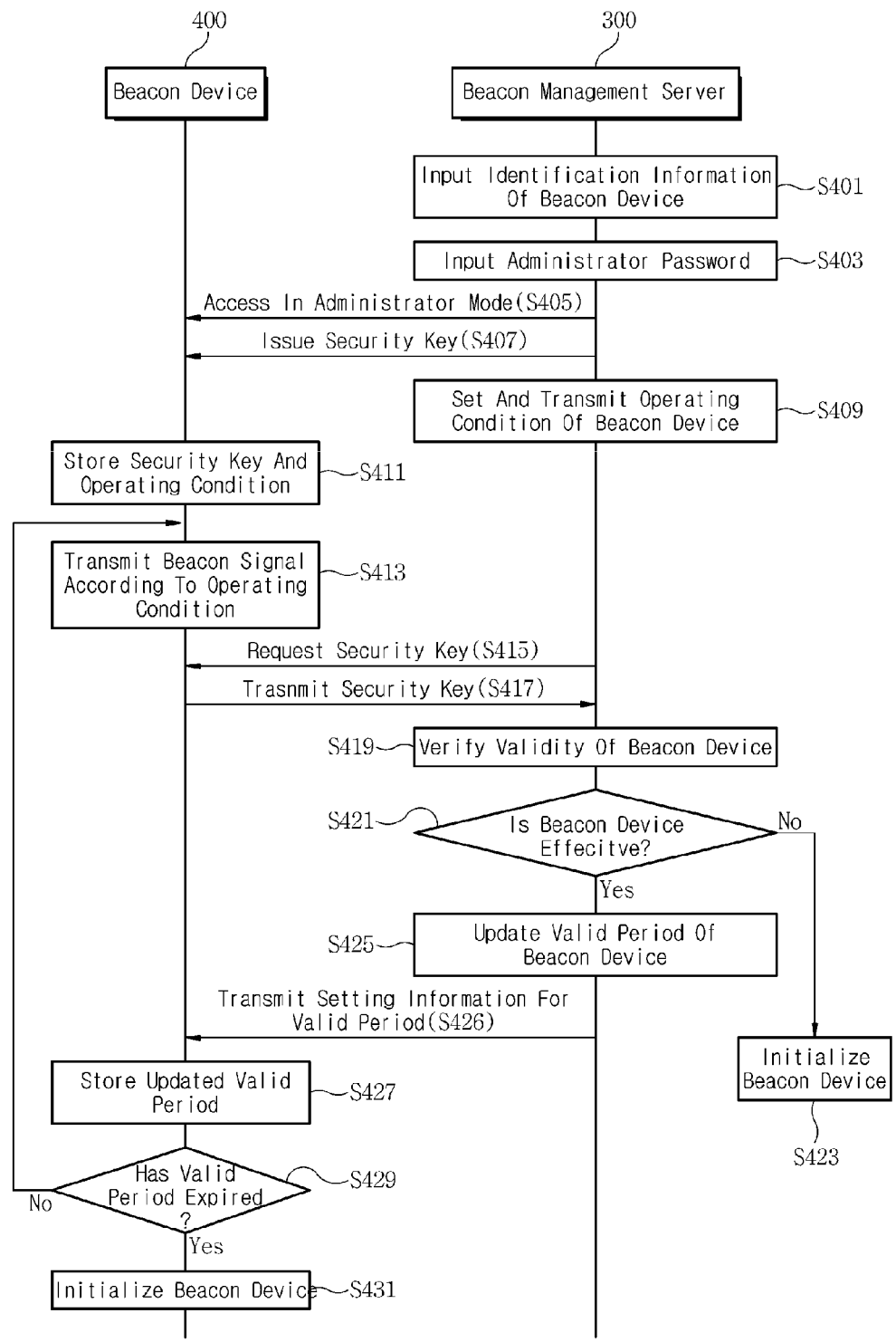
FIG. 8 is a sequence diagram illustrating a procedure of a beacon device management service according to an embodiment of the present invention.

FIG. 8 is a sequence diagram illustrating a service procedure for managing a beacon device according to an embodiment of the present invention.

Referring to FIG. 8, when the beacon management server 300 inputs identification information of the beacon device 400 (S401) to establish a communication session with the beacon device 400, a beacon device management system according to an embodiment of the present invention inputs a predetermined administrator password (S403).

In this case, when the administrator password is authenticated, the beacon management server 300 may access the beacon device 400 in an administrator mode (S405).

The beacon management server 300 that is connected in the administrator mode may issue a security key to the beacon device 400 (S407) and set an operating condition of a beacon signal transmitted from the beacon device 400 and transmit the operating condition to the beacon device 400 (S409).

In this case, the operating condition may include one or more of an ID, a transmission power, a signal interval, and an valid period of the beacon signal transmitted from the beacon device 400. Here, the valid period denotes a time for which the beacon signal transmitted from the beacon device 400 is maintained.

Moreover, the beacon management server 300 may encrypt the transmitted operating condition with the security key and transmit the encrypted operating condition to the beacon device 400.

The beacon device 400 stores the security key and the operating condition that are received from the beacon management server 300 (S411) and transmits a beacon signal according to the operating condition (S413).

Subsequently, the beacon management server 300 periodically communicates with the beacon device 400 to request the security key issued to the beacon device 400 in order to verify validity of the beacon device 400 (S415). In response to the request, the beacon device 400 transmits the security key stored in the beacon device 400 to the beacon management server 300 (S417).

In this case, the beacon management server 300 may control an operation of the beacon device 400 in communication with the beacon device 400 or may further set a user password for directly controlling the operation of the beacon device 400 and provide the user password to the beacon device 400.

Upon receiving the security key from the beacon device 400, the beacon management server 300 verifies the validity of the beacon device 400 (S419) and determines whether the beacon device is valid (S421).

Here, the validity verification of the beacon management server 300 may be performed by comparing the security key issued to the beacon device 400 with the security key received from the beacon device 400 that is currently connected.

In addition, the validity verification may include a hash algorithm and a digital signature of electronic information attached to or logically combined with an electronic document.

In this case, when the validity of the beacon device 400 is not verified, the beacon management server 300 according to an embodiment of the present invention determines that a security breach has occurred in the currently connected beacon device 400 and then initializes the currently connected beacon device 400 (S423).

In this case, the beacon management server 300 according to an embodiment of the present invention may restrict the beacon device 400 from resetting or changing the user password in order to prevent illegal use of the beacon device 400.

On the other hand, when the validity of the beacon device 400 is verified, the beacon management server 300 updates the valid period of the beacon device 400 (S425) and transmits the updated valid period setting information to the beacon device 400 (S426).

The beacon device 400 according to an embodiment of the present invention receives the validity period information from the beacon management server 300 and stores the updated valid period (S427).

Subsequently, the beacon device 400 periodically checks the operating condition including the prestored valid period and determines whether the valid period of the beacon device 400 has expired (S429).

When the determination result is that the valid period of the beacon device 400 has expired, the beacon device 400 may initialize itself.

Here, when the valid period has expired but the beacon device 400 is connected with the beacon management server 300, the beacon device 400 may be initialized through the beacon management server 300.

In addition to the initialization of the beacon device 400, the information stored in the beacon device 400 may be deleted.

Moreover, the beacon device 400 may be restricted from performing a task of attempting to reset or change the prestored user password.

Furthermore, the beacon device 400 may be restricted from changing environmental settings including the prestored operating condition.

Figure 9:
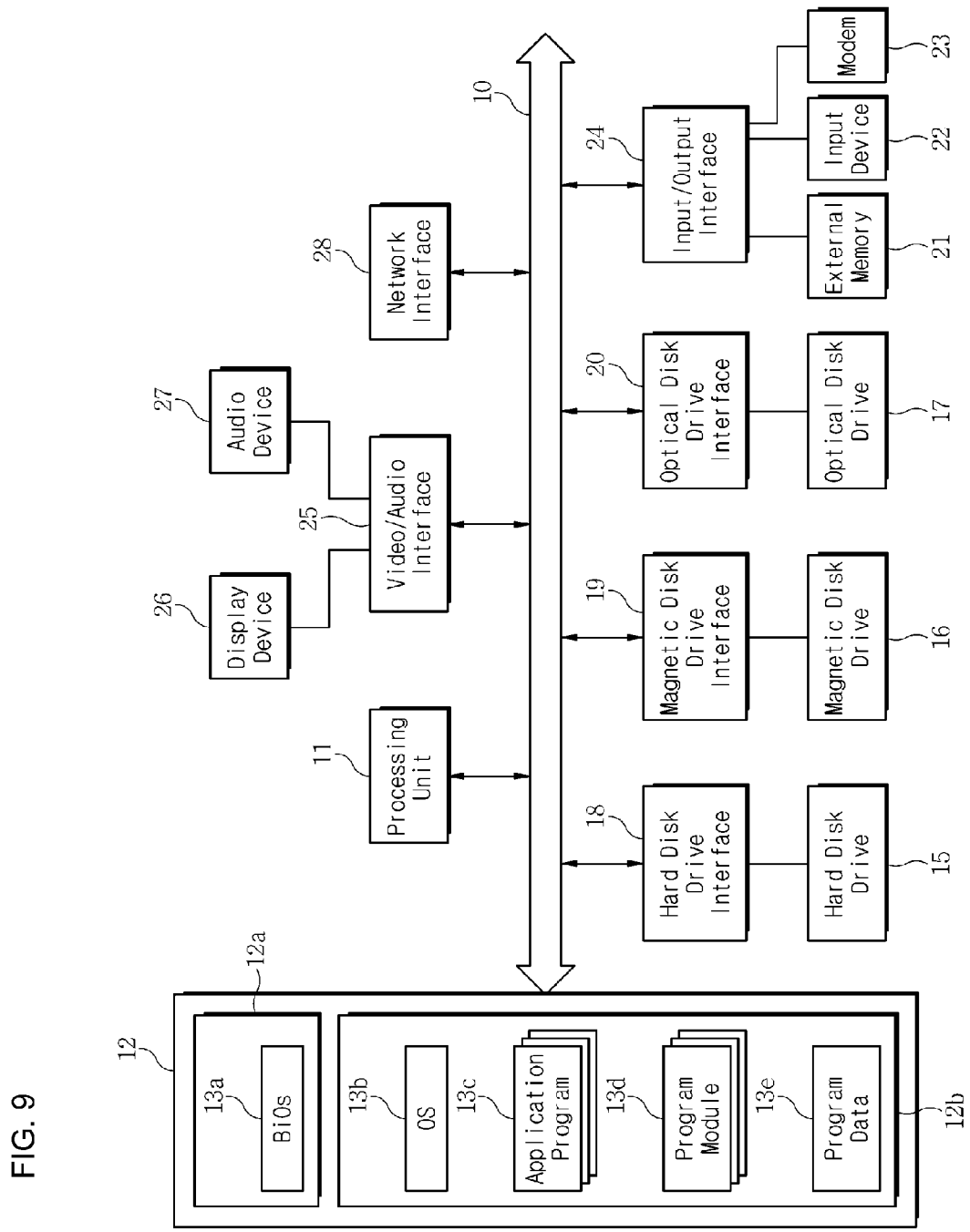
FIG. 9 is a block diagram showing an operating environment of a device for providing a beacon device management service according to an embodiment of the present invention.

FIG. 9 is a block diagram showing an operating environment of a device for providing a beacon device management service according to an embodiment of the present invention.

FIG. 9 and the following discussion are intended to provide a brief, general description of a suitable computing environment in which the present invention may be implemented.

Although not required, the invention will be described in the general context of computer-executable instructions, such as program modules, being executed by computer systems.

Generally, program modules include routines, programs, objects, components, data structures, and the like, which perform particular tasks or implement particular abstract data types.

Computer-executable instructions, associated data structures, and program modules represent examples of the program code means for executing acts of the methods disclosed herein.

Referring to FIG. 9, an example computing system for implementing the invention includes a general-purpose computing device in the form of a computer system including a processing unit 11, a system memory 12, and a system bus 10 that couples various system components including the system memory 12 to the processing unit 11.

The processing unit 11 may execute computer-executable instructions designed to implement features of the present invention.

The system bus 10 may be any of several types of bus structures including a memory bus or memory controller, a peripheral bus, and a local bus using any of a variety of bus architectures. The system memory 12 includes a read only memory (ROM) 12a and a random access memory (RAM) 12b.

A basic input/output system (BIOS) 13a, containing the basic routines that help transfer information between elements within the computing system, such as during start-up, may be stored in the ROM 12a.

The computing system may also include storage devices including, for example, a hard disk drive 15 for reading information from or writing information to a hard disk, a magnetic disk drive 16 for reading information from and writing information to a magnetic disk, and an optical disk drive 17 for reading information from or writing information to an optical disk, such as, for example, a CD-ROM or other optical media.

The hard disk drive 15, magnetic disk drive 16, and optical disk drive 17 are connected to the system bus 10 by a hard disk drive interface 18, a magnetic disk drive interface 19, and an optical drive interface 20, respectively.

In addition, the computing system may further include an external memory 21 as the storage device. The external memory 21 may be connected to the system bus 10 through an input/output interface 24.

The drives and their associated computer-readable media provide nonvolatile storage of computer-executable instructions, data structures, program modules, and other data. Although the example environment described herein employs the hard disk 15, the magnetic disk and the optical disk 17, other types of computer-readable media for storing data may be used, including magnetic cassettes, flash memory cards, digital versatile disks, Bernoulli cartridges, RAMs, ROMs, and the like.

Program code means including one or more program modules may be stored in the hard disk 15, the magnetic disk 16, the optical disk 17, the ROM 12a, or the RAM 12b, including an operating system 13b, one or more application programs 13c, other program modules 13d, and program data 13e, which are loaded and executed by the processing unit 11.

Moreover, a user may enter commands and information into the computing system through a keyboard, a pointing device, or other input devices 22, such as a microphone, joy stick, game pad, scanner, or the like.

These input devices 22 can be connected to the processing unit 11 through the input/output interface 24 coupled to the system bus 10.

The input/output interface 24 logically represents any of a wide variety of possible interfaces, such as a serial port interface, a PS/2 interface, a parallel port interface, a Universal Serial Bus (USB) interface, or an Institute of Electrical and Electronics Engineers (IEEE) 1394 interface (i.e., a FireWire interface), or may even logically represent a combination of different interfaces.

In addition, the computing system according to the present invention may further include a display device 26 such as a monitor or liquid crystal display (LCD) and an audio device 27 such as a speaker or microphone. The display device 26 and the audio device 27 are connected to the system bus 10 through a video/audio interface 25.

For example, other peripheral output devices (not shown), such as speakers and printers, can also be connected to the computer system.

The video/audio interface 25 may include a High Definition Multimedia Interface (HDMI), a Graphics Device Interface (GDI), etc.

In addition, the computing system is connectable to networks, such as, for example, an office-wide or enterprise-wide computer network, a home network, an intranet, and/or the Internet.

The computer system can exchange data with external sources, such as, for example, remote computer systems, remote applications, and/or remote databases over such networks.

The computing system according to the present invention includes a network interface 28, through which the computing system receives data from external sources and/or transmits data to external sources.

In the present invention, the computing system may transmit information to or receive information from a device located in a remote position through the network interface 28.

For example, on a condition that the computing system denotes the beacon device 400, the computing system may transmit information to or receive information from the beacon management server 300 through the network interface 28. On a condition that the computing system denotes the beacon service server 200, the computing system may transmit information to or receive information from the user terminal 100 through wired/wireless Internet communication of the network interface 28.

The network interface 28 can logically represent one or more software and/or hardware modules, such as, for example, a network interface card and corresponding Network Driver Interface Specification (NDIS) stack.

Likewise, the computer system receives data from external sources and/or transmits data to external sources through the input/output interface 24.

The input/output interface 24 may be coupled to a modem 23 (e.g., a standard modem, a cable modem, or a digital subscriber line (DSL) modem), through which the computer system receives data from and/or transmits data to external sources.

While FIG. 9 represents a suitable operating environment for the present invention, the principles of the present invention may be employed in any system that is capable of, with suitable modification if necessary, implementing the principles of the present invention.

The environment illustrated in FIG. 9 is illustrative only and by no means represents even a small portion of the wide variety of environments in which the principles of the present invention may be implemented.

Moreover, a variety of information that is generated when the beacon device management service program according to an embodiment of the present invention is executed may be stored and accessed from any of the computer-readable media associated with the computing system as shown in FIG. 9.

For example, portions of such program modules and portions of associated program data may be included in the operating system 13b, application programs 13c, program modules 13d, and/or program data 13e, for storage in the system memory 12.

When a mass storage device, such as a hard disk, is coupled to the computing system, such program modules and associated program data may also be stored in the mass storage device.

In a networked environment, program modules associated with the present invention, or portions thereof, can be stored in remote memory storage devices, such as, for example, a system memory and/or mass storage devices associated with a remote computer system connected through the modem 23 of the input/output interface 24 or the network interface 28, for example, computing systems of the user terminal 100, the beacon service server 200, the beacon management server 300, and the beacon device 400.

As described above, execution of such modules may be performed in a distributed environment.

The specification includes details of a number of specific implements, but it should be understood that the details do not limit any invention or what is claimable in the specification but rather describe features of the specific embodiment.

Features described in the specification in the context of individual embodiments may be implemented as a combination in a single embodiment.

In contrast, features described in the specification in the context of a single embodiment may be implemented in multiple embodiments individually or in an appropriate sub-combination. Furthermore, the features may operate in a certain combination and may be initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all of the operations be executed.

In some cases, multitasking and parallel processing may be beneficial. In addition, it should not be understood that the separation of various system components in the above described embodiments is required in all embodiments, and it should be understood that the above described program components and systems may be incorporated into a single software product or may be packaged in multiple software products.

Thus, particular embodiments have been described. Other embodiments are within the scope of the following claims.

For example, the operations recited in the claims can be performed in a different order and still achieve desirable results.

As an example, operations depicted in the drawings in a particular order should not be understood as requiring that such operations be performed in the particular order shown or in sequential order. In certain implementations, multitasking and parallel processing may be advantageous.

The description suggests the best mode of the present invention to provide an example that explains the present invention and also enables one skilled in the art to manufacture and use the present invention.

The specification drafted as such is not limited to detailed terms suggested in the specification.

Accordingly, it will be apparent to those skilled in the art that various modifications, changes, and variations may be made in the example without departing from the scope of the invention.

Accordingly, the scope of the present invention should be defined not by the embodiments but by the claims.

It should be understood that the embodiments disclosed herein are merely illustrative and are not intended to limit the scope of the invention.

Although specific embodiments have been illustrated and described herein, it is obvious to those skilled in the art that many modifications of the present invention may be made without departing from what is intended to be limited solely by the appended claims.

The present invention is directed to a method and apparatus for managing a beacon device. More particularly, an operating condition including a valid period of a beacon device installed in a store may be controlled through a beacon management server. To this end, the beacon management server manages the beacon device by accessing the beacon device in an administrator mode, issuing a security key for verifying the validity, and setting an operating condition including the valid period when the validity of the beacon device is verified.

When the validity is not verified, the beacon device is initialized and restricted from changing environmental settings of the beacon device, and thereby the use of the beacon device is limited.

According to an embodiment of the present invention, when the beacon device is lost, the beacon device may check that the connection with the beacon management server has been disconnected, initialize itself, delete information stored therein, provide a high-security beacon service, and stop transmitting a beacon signal after the beacon device is lost, thereby overcoming inconvenience for service users.

Moreover, the present invention has industrial applicability in that the present invention can contribute to the development of industry and also in that the possibility of sales or business is sufficient and also actually the present invention may be carried out.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A beacon management server comprising:
   a communication module connected with a beacon device through a communication network and configured to transmit or receive data for managing authority of the beacon device;
   a security authentication module configured to secure setting authority of the beacon device in an administrator mode in which the beacon device is accessed with a predetermined administrator password, issue a security key, and periodically check the issued security key to verify validity of the beacon device;
   a beacon management module configured to set an operating condition including one or more of an ID, a transmission power, a signal interval, and an valid period of a beacon signal of the beacon device to which the security key is issued and update the valid period according to the validity verification of the security authentication module; and
   a storage module configured to store one or more of the operating condition and the security key for each piece of beacon identification information.

2. The beacon management server of claim 1, wherein the security authentication module controls a beacon operation in communication with the beacon device or sets a user password for allowing direct access of the beacon device and control of the beacon operation.

3. The beacon management server of claim 1, wherein, when the validity of the beacon device is not verified, the beacon management module is configured to control deactivation of a beacon signal transmission function of the beacon device.

4. The beacon management server of claim 1, wherein, when the validity of the beacon device is not verified, the beacon management module is configured to initialize the beacon device, to control of restriction from resetting or changing a user password.

5. A beacon device comprising:
   a network interface module connected with a beacon management server through a communication network and configured to transmit or receive data for controlling the beacon device;
   a signal transmission module configured to a transmit Bluetooth low energy (BLE)-based beacon signal;
   a control module configured to receive a predetermined administrator password from the beacon management server, provide setting authority, receive a security key and an operating condition including an valid period from the beacon management server, perform control such that the signal transmission module transmits the beacon signal according to the operating condition, transmit the security key in response to a security key request for verifying validity of the beacon device from the beacon management server, and reset an updated valid period when the validity is verified; and
   a storage module configured to store a beacon signal operating condition including the valid period set from the beacon management server.

6. The beacon device of claim 5, wherein, when the beacon device has been disconnected from the beacon management server for a certain time or more or when the valid period has expired, the control module configured to initialize and delete of information stored in the beacon device.

7. The beacon device of claim 5, wherein, when the beacon device has been disconnected from the beacon management server for a certain time or more or when the valid period has expired, the control module configured to control of restriction from resetting or changing a user password.

8. The beacon device of claim 5, wherein, when the beacon device has been disconnected from the beacon management server for a certain time or more or when the valid period has expired, the control module configured to control of restriction from changing environmental settings including the operating condition.

9. A beacon management service method comprising:
- at a beacon management server, transmitting of a predetermined administrator password to a beacon device;
- at the beacon management server, receiving a setting authority from the beacon device;
- at the beacon management server, issuing a security key of the beacon device;
- at the beacon management server, transmitting the issued security key and an operating condition including a valid period of the beacon device;
- the beacon management server, receiving the security key from the beacon device in periodic
- checking, by the beacon management server, the issued security key in periodic communication with the beacon device;
- at the beacon management server, determining whether the received security key and the issued security keys are the same;
- when the security keys are the same, at a beacon management server, updating the valid period of the beacon device; and
- at the beacon management server, transmitting the updated the valid period of the beacon device to the beacon device.

* * * * *